US010778722B2

(12) United States Patent
Hobson et al.

(10) Patent No.: US 10,778,722 B2
(45) Date of Patent: Sep. 15, 2020

(54) DYNAMIC FLOW SYSTEM

(71) Applicant: Massachusetts Institute of Technology, Cambridge, MA (US)

(72) Inventors: Thomas R. Hobson, Belmont, MA (US); William W. Streilein, Sudbury, MA (US); Hamed Okhravi, Billerica, MA (US); Richard W. Skowyra, Somerville, MA (US); Kevin S. Bauer, Westford, MA (US); Veer S. Dedhia, Somerville, MA (US); David O. Bigelow, Maynard, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 285 days.

(21) Appl. No.: 15/346,072

(22) Filed: Nov. 8, 2016

(65) Prior Publication Data
US 2018/0131720 A1    May 10, 2018

(51) Int. Cl.
*H04L 29/06* (2006.01)
(52) U.S. Cl.
CPC .......... *H04L 63/20* (2013.01); *H04L 63/0263* (2013.01); *H04L 63/1416* (2013.01)
(58) Field of Classification Search
CPC ............................ H04L 63/20; H04L 63/0263
USPC .......................................................... 713/1
See application file for complete search history.

(56) References Cited

U.S. PATENT DOCUMENTS 5,968,176 A * 10/1999 Nessett ................... H04L 63/02
726/11
6,609,197 B1 * 8/2003 Ketcham ................. H04L 41/08
380/264
6,738,908 B1 * 5/2004 Bonn ...................... H04L 29/06
707/999.009
7,016,980 B1 * 3/2006 Mayer .................. H04L 41/0853
709/248
8,327,414 B2 * 12/2012 Strassner ............ H04L 63/0263
704/1

(Continued)

OTHER PUBLICATIONS

Ahmed A. Hassan, A Framework for Translating a High Level Security Policy Into Low Level Security Mechanisms, 2010,Journal of Electrical Engineering, vol. 61, No. pp. 20-28 (Year: 2010).*

*Primary Examiner* — Shahriar Zarrineh
(74) *Attorney, Agent, or Firm* — Daly, Crowley, Mofford & Durkee, LLP

(57) ABSTRACT

System and methods for communicating across a network comprise: a database containing high level security rules for the network; computing devices communicating on the network; a security rule translation module; event sensors configured to monitor and detect one or more events occurring on or relating to the network, and in response thereto, provide to the security rule translation module an indication of occurrence for each of the one or more security events. The security rule translation module may associate the security rules with the security events corresponding to the received indication, and produce a low-level security rule based on data from the high-level security rule and the received indication of occurrence of the security events. The system may also include switches coupled to receive the low-level security rules from the security rule translation module and enforce the low-level security rules on the network.

20 Claims, 5 Drawing Sheets

(56) References Cited

U.S. PATENT DOCUMENTS

| | | | |
|---|---|---|---|
| 8,972,449 B2* | 3/2015 | Lim | G06F 21/6218 707/784 |
| 9,059,960 B2* | 6/2015 | Burchfield | H04L 63/0263 |
| 9,083,753 B1* | 7/2015 | Lee | H04L 63/0876 |
| 9,356,932 B2* | 5/2016 | Krell | H04L 63/20 |
| 9,369,431 B1* | 6/2016 | Kirby | H04L 63/02 |
| 9,521,115 B1* | 12/2016 | Woolward | H04L 63/0263 |
| 9,736,185 B1* | 8/2017 | Belamaric | H04L 63/20 |
| 9,935,937 B1* | 4/2018 | Potlapally | H04L 63/0823 |
| 10,182,035 B2* | 1/2019 | Basler | H04L 63/0236 |
| 2002/0093527 A1* | 7/2002 | Sherlock | H04L 41/069 715/736 |
| 2002/0138726 A1* | 9/2002 | Sames | H04L 63/14 713/166 |
| 2002/0178246 A1* | 11/2002 | Mayer | H04L 41/0893 709/223 |
| 2003/0014644 A1* | 1/2003 | Burns | H04L 63/0263 713/182 |
| 2003/0046583 A1* | 3/2003 | Goldman | H04L 63/0263 726/4 |
| 2003/0120955 A1* | 6/2003 | Bartal | H04L 41/0893 726/4 |
| 2003/0126468 A1* | 7/2003 | Markham | H04L 63/0218 726/13 |
| 2003/0177389 A1* | 9/2003 | Albert | H04L 12/2856 726/1 |
| 2004/0167984 A1* | 8/2004 | Herrmann | H04L 63/08 709/229 |
| 2005/0047570 A1* | 3/2005 | Schmid | H04L 63/1408 379/189 |
| 2005/0076121 A1* | 4/2005 | Kortum | H04L 63/0209 709/225 |
| 2005/0125694 A1* | 6/2005 | Fakes | G06F 21/56 726/4 |
| 2008/0034401 A1* | 2/2008 | Wang | H04L 63/20 726/1 |
| 2008/0178255 A1* | 7/2008 | Gaikovich | G06F 21/6218 726/1 |
| 2008/0307487 A1* | 12/2008 | Choyi | H04L 63/20 726/1 |
| 2009/0007219 A1* | 1/2009 | Abzarian | H04L 63/20 726/1 |
| 2009/0125646 A1* | 5/2009 | Rosenan | G06F 21/606 710/15 |
| 2009/0150972 A1* | 6/2009 | Moon | H04L 63/102 726/1 |
| 2010/0082687 A1* | 4/2010 | Saito | G06F 21/10 707/786 |
| 2010/0325685 A1* | 12/2010 | Sanbower | G06F 21/554 726/1 |
| 2011/0225647 A1* | 9/2011 | Dilley | H04L 63/0218 726/14 |
| 2013/0291052 A1* | 10/2013 | Hadar | G06F 21/6218 726/1 |
| 2014/0075519 A1* | 3/2014 | Porras | H04L 63/107 726/4 |
| 2014/0317684 A1* | 10/2014 | Porras | H04L 63/20 726/1 |
| 2014/0331280 A1* | 11/2014 | Porras | H04L 63/20 726/1 |
| 2015/0010012 A1* | 1/2015 | Koponen | H04L 41/0873 370/411 |
| 2015/0150079 A1* | 5/2015 | Hyatt | H04L 43/045 726/1 |
| 2015/0237013 A1* | 8/2015 | Bansal | H04L 63/0263 726/13 |
| 2015/0264011 A1* | 9/2015 | Liang | H04L 63/0209 726/11 |
| 2015/0269383 A1* | 9/2015 | Lang | G06F 21/57 726/1 |
| 2016/0043996 A1* | 2/2016 | Syed Mohamed | H04L 63/0485 726/1 |
| 2016/0080422 A1* | 3/2016 | Belgodere | H04L 63/20 706/47 |
| 2016/0112460 A1* | 4/2016 | Li | H04L 63/0236 726/1 |
| 2016/0149887 A1* | 5/2016 | Katmor | H04L 63/0263 726/1 |
| 2016/0191466 A1* | 6/2016 | Pernicha | H04L 63/20 726/1 |
| 2016/0205071 A1* | 7/2016 | Cooper | H04L 12/6418 726/1 |
| 2016/0212717 A1* | 7/2016 | Ge | H04W 52/04 |
| 2016/0219048 A1* | 7/2016 | Porras | H04L 63/20 |
| 2016/0294774 A1* | 10/2016 | Woolward | H04L 63/0236 |
| 2016/0359907 A1* | 12/2016 | Lam | H04L 63/20 |
| 2016/0366184 A1* | 12/2016 | Luo | H04L 63/20 |
| 2017/0005986 A1* | 1/2017 | Bansal | H04L 63/0263 |
| 2017/0064749 A1* | 3/2017 | Jain | G06F 16/9024 |
| 2017/0134422 A1* | 5/2017 | Shieh | H04L 63/1491 |
| 2017/0195292 A1* | 7/2017 | Pham | H04L 63/0245 |
| 2017/0214717 A1* | 7/2017 | Bush | H04L 63/107 |
| 2017/0317976 A1* | 11/2017 | Chalvadi | H04L 63/0263 |
| 2017/0324781 A1* | 11/2017 | Hu | H04L 63/0227 |
| 2017/0374032 A1* | 12/2017 | Woolward | H04L 63/0263 |
| 2018/0007005 A1* | 1/2018 | Chanda | H04L 63/0236 |
| 2018/0331909 A1* | 11/2018 | Zhang | H04L 41/0893 |

\* cited by examiner

DYNAMIC FLOW SYSTEM

FEDERALLY SPONSORED RESEARCH

This invention was made with Government support under Contract No. FA8721-05-C-0002 awarded by the U.S. Air Force. The Government has certain rights in the invention.

FIELD

This disclosure relates to network communication and security and, more particularly, to dynamically controlling network communication and security.

BACKGROUND

OpenFlow is a communication protocol that provides access to the forwarding plane of a network switch or router over a network. It enables network controllers to determine the path of network packets across a network of switches. The controllers are distinct from the switches. This separation of the control from the forwarding allows for more sophisticated traffic management than is feasible using access control lists (ACLs) and routing protocols. Also, OpenFlow allows switches from different vendors—often each with their own proprietary interfaces and scripting languages—to be managed remotely using a single, open protocol. The protocol's inventors consider OpenFlow an enabler of software defined networking (SDN).

OpenFlow allows remote administration of a layer 2 switch's packet forwarding tables, by adding, modifying and removing packet matching rules and actions. This way, routing decisions can be made periodically or ad hoc by the controller and translated into rules and actions with a configurable lifespan, which are then deployed to a switch's flow table, leaving the actual forwarding of matched packets to the switch at wire speed for the duration of those rules. Packets which are unmatched by the switch can be forwarded to the controller. The controller can then decide to modify existing flow table rules on one or more switches or to deploy new rules, to prevent a structural flow of traffic between switch and controller. It could even decide to forward the traffic itself, provided that it has told the switch to forward entire packets instead of just their header.

The OpenFlow protocol is layered on top of the Transmission Control Protocol (TCP), and prescribes the use of Transport Layer Security (TLS). Controllers should listen on TCP port 6653 for switches that want to set up a connection. Earlier versions of the OpenFlow protocol unofficially used port 6633.

SUMMARY

In an embodiment, a system for communicating across a network comprises: a database containing one or more high level security rules for the network; a plurality of computing devices communicating on the network; a security rule translation module; a plurality of event sensors configured to monitor and detect one or more events occurring on or relating to the network, and in response thereto, provide to the security rule translation module an indication of occurrence for each of the one or more security events. In response to the security rule translation module receiving the indication of occurrence for each of the one or more security events from the event sensors, the security rule translation module may associate one or more of the security rules with the security events corresponding to the received indication, and produces a low-level security rule based on data from the high-level security rule and the received indication of occurrence of the security events.

The system may also include one or more switches coupled to receive the low-level security rules from the security rule translation module and enforce the low-level security rules on the network.

In another embodiment, a method for communicating across a network comprises: receiving one or more security network events by one or more network security sensors; translating, by one or more sensor event handler modules, the one or more security network events into network security statements, wherein the network security statements are high level security statements having a common format; receiving, by a policy resolver, the one or more security network statements and a current security state of the network that includes at least one identifier of a network device; translating, by the policy resolver, the one or more network security statements into low level security rule that incorporate the identifier of the network device; and modifying, by a policy enforcement kernel, one or more firewall tables of one or more network switches to include the low level security rules In another embodiment, a system for communicating across a network comprises: a plurality of computing devices communicating on the network; a plurality of event sensors configured to monitor and detect security events occurring on the network; a database containing high level security rules for the network; a binding database containing data representing a current state of the network; a security rule translation module configured to receive the security events from the event sensors, associate one or more of the security rules with the received security events, receive a state of a network entity associated with the security rule from the binding database, and produce a low level security rule based on data from the high level security rule, the received security events, and the state of the network entity; and one or more switches coupled to receive the low level security rules from the security rule translation module and enforce the low level security rules on the network

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like reference numbers in the figures denote like elements.

DETAILED DESCRIPTION

Figure 1:
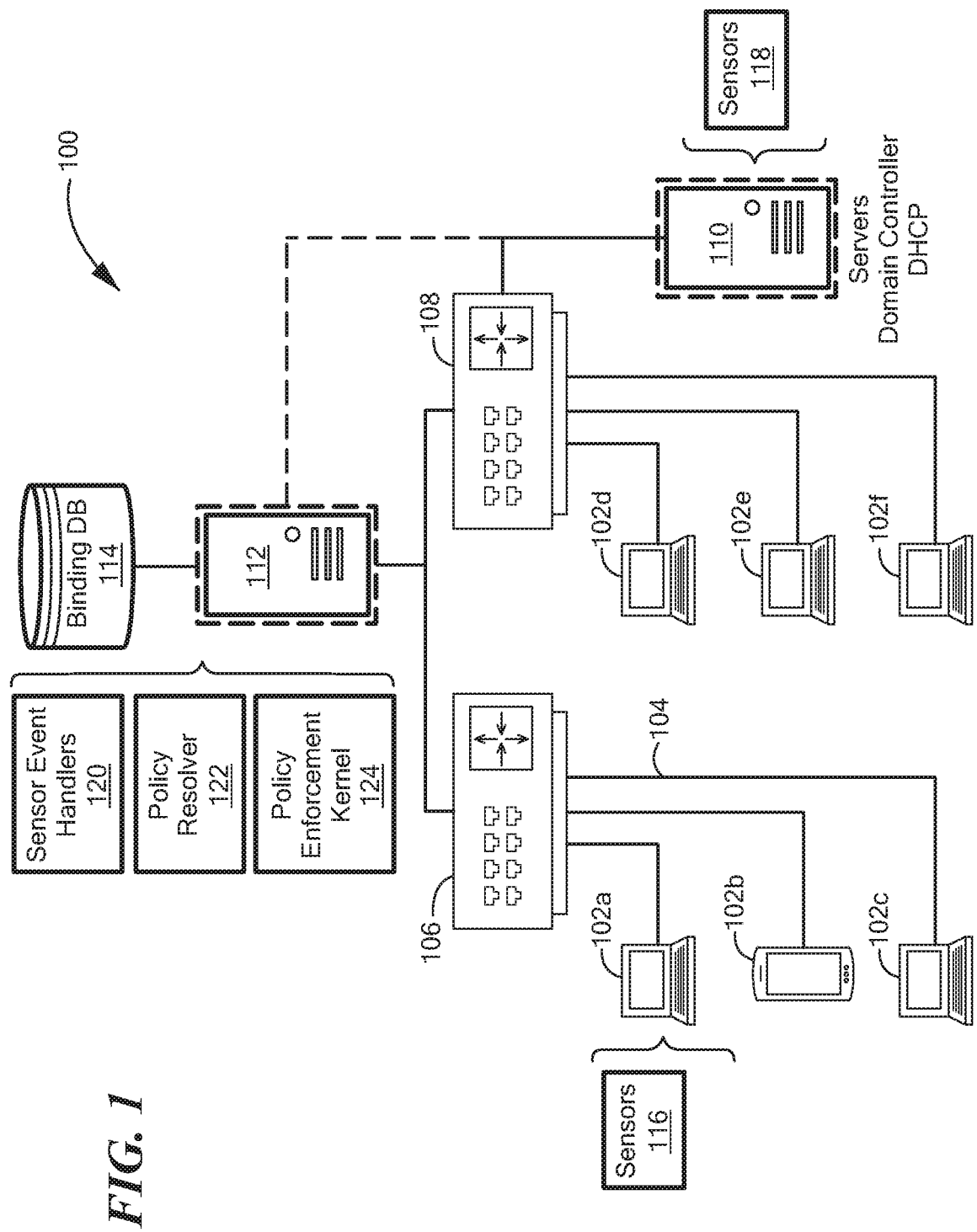
FIG. 1 is a network diagram of a communication network.

Referring now to FIG. 1, a communication system 100 includes network devices 102a-102f that may communicate over a network provided from a plurality of signal paths such as communication link 104. Network devices 102a-102f may be any type of device capable of communication over a computer network. Examples of network devices include, but are not limited to, computers, tablets, smart phones, printers, servers, wearable computing devices, etc.

Network devices 102a-102f may communicate with each other through communication links (such as communication link 104, for example) to network switches 106 and 108. Communication links (e.g. communication link 104) that allow network devices 102a-102f to communicate on the network may be wired or wireless connections, or any other type of communication link known in the art that allows for communication between computing devices.

In embodiments, network devices 102a-102f may communicate on a local-area network, a wide-area network, a cellular network, an internet, or on any scale of network appropriate for communication between computing devices.

System 100 may also include one or more servers 110 that may also communicate on the network. Although shown as a single server for ease of illustration, server 110 may comprise multiple servers in the same or different geographical locations. Server 110 may be any type of server including, but not limited to, a file server, a domain controller, a DHCP server, a print server, a database server, etc.

In an embodiment, system 100 also includes a so-called dynamic flow isolation (DFI) server 112. Although shown and described as a single server for ease of illustration, DFI server 112 may also comprise multiple servers in the same or different geographical locations. Thus, in some embodiments, DFI server may be implemented as a distributed server.

DFI server 112 may be configured to create and implement security policies across the network. In an embodiment, DFI server 112 may implement the security policies by generating low-level security rules that can be programmed into switch 106 and/or 108.

Network 100 also includes a binding database 114 to store a current security state of the network. The security state may be a snapshot of the current state of the network that can assist DFI server 112 in generating the low level rules. Data within binding database 114 may include, but is not limited to: logon events, logon status of users, MAC addresses, network addresses, host names, usernames, and network location (e.g. switch ID and port number).

The data within binding database 114 is dynamically updated as events on the network take place. For example, if server 110 records an event of a particular user logging into computing device 102d, server 110 may transmit an indication of the event to binding database 114 such that the occurrence of the event can be recorded in the database. Binding database 114 may then store data describing the event and associate the particular user, their username, and their logon event with computing device 102d. Binding database 114 may also associate the IP address of computing device 102d, the MAC address of computing device 102d, the type of network connection being used by computing device 102d, the network location (e.g. the switch 108 and port number) to which computing device 102d is attached, the host name of computing device 102d, the domain that the user logged into, or any other network information associated with the logon event.

One skilled in the art will recognize similar information can be recorded in binding database 114 for other types of events, including but not limited to, logoff events, communication events, printing events, etc. (Communication events may include any event where a computing device attempts to communicate with another computing device. These can include, but are not limited to: instant messages, email, logon/logoff validation, file sharing, printing, database queries, or any type of network communication.) Binding database 114 may be, for example, a relational database implemented by DFI server 112, or any other type of database implemented by DFI server 112 or any computing device capable of providing database services.

In an embodiment, one or more of computing devices 102a may function as network sensors (e.g. execute program code such that the device may operate as one or more network sensors 116) and server 110 may execute program code to provide network sensors 118. Network sensors 116 and 118 may be software modules (e.g. drivers, services, applications, or other executable software elements) that detect network security events, such as logon/logoff events, communication events, etc.

In an embodiment, DFI server 112 may execute sensor event handlers 120, policy resolver 122, and/or policy enforcement kernel 124. Sensor event handlers 120, policy resolver 122, and policy enforcement kernel 124 may also be software modules. Sensor event handlers 120 may be configured to receive security events from network sensors 116 and 118 and convert the security events into high-level security statements. Policy resolver 122 may receive the security statements from sensor event handlers 120 and generate a low-level security rule that can be applied to switch 106 and/or 108. And policy enforcement kernel 124 may be configured to receive the low-level security rules from policy resolver 122 and apply them to switch 106 and/or 108.

One skilled in the art will recognize that system 100, as depicted in FIG. 1, is provided as an example of a system that can implement a dynamic flow isolation. The system 100 depicted in FIG. 1 shall not be construed as limiting—other network architectures can also implement a dynamic flow isolation.

Figure 2:
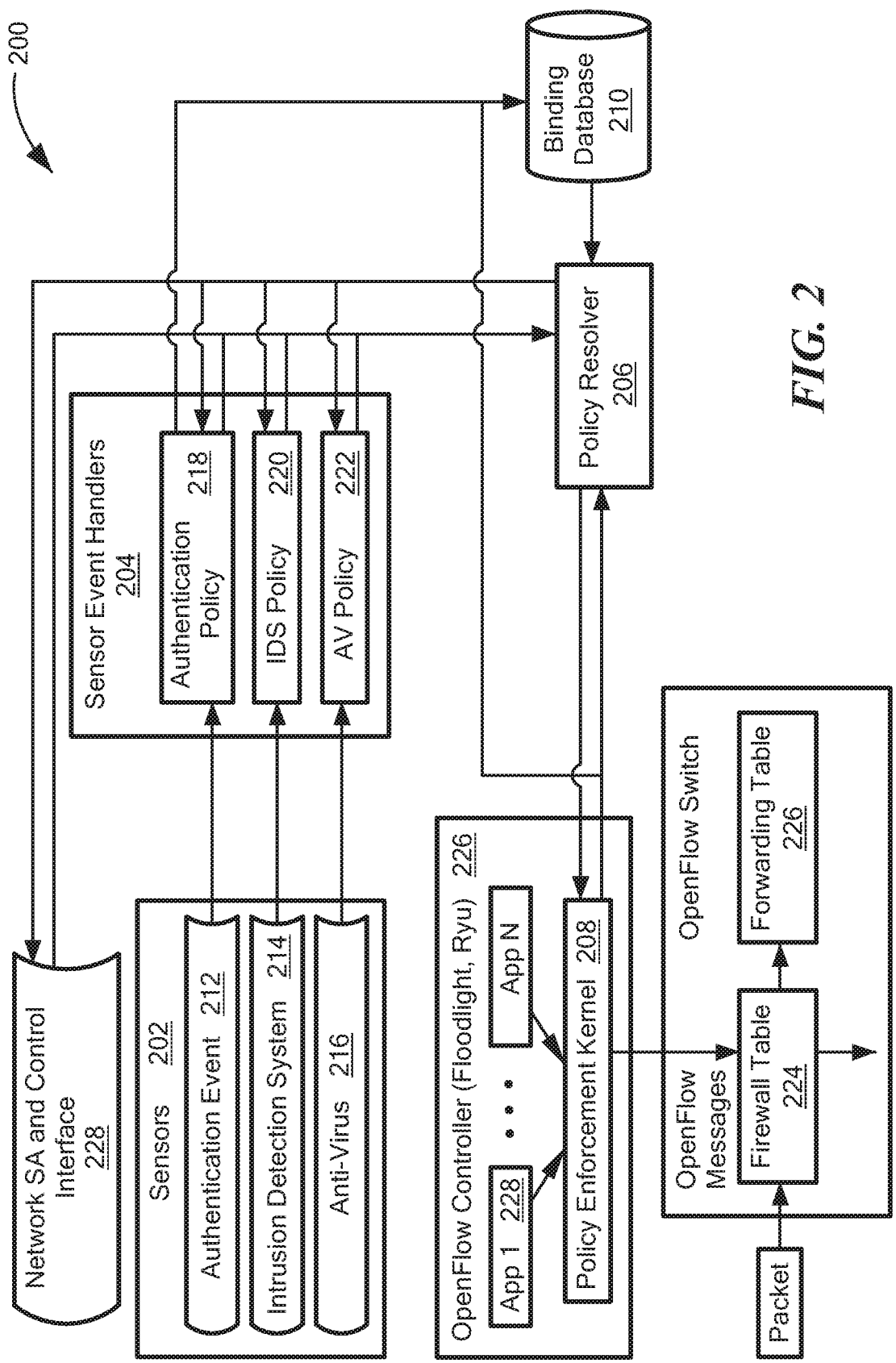
FIG. 2 is an architecture diagram of a system for dynamically configuring network security.

Referring now to FIG. 2, a software architecture 200 for implementing a dynamic flow security scheme may be implemented by a system such as system 100. Architecture 200 includes sensors 202, which may be the same as or similar to sensors 116 and/or 118. Sensor event handlers 204, policy resolver 206, and policy enforcement kernel 208 may be the same as or similar to sensor event handlers 120, policy resolver 122, and policy enforcement kernel 124, respectively.

Sensors 202 may include one or more software-based sensor modules to detect network security events. An authentication event sensor 212, an intrusion detection event sensor 214, and an anti-virus event sensor 216 are shown, however other event sensors may also be included.

Sensors 202 may also include other sensors including, but not limited to: a physical location event sensor (e.g. network security may be controlled based upon the physical location of a user, which can be tracked with RFID cards, location off a computing device accessed by the user, or other types of personal identification associated with the user), a host-based monitoring system sensor (that may check compliance, etc.), a time of day sensor (to enable day/night shifts, etc.), a multi-factor authentication sensor (phone, SMS, etc.), a physical security sensor (fire alarm, etc.), an imaging sensor (e.g. video cameras), an audio sensor (e.g. microphones), or any other sensor that can collect information from network traffic or access to centrally managed systems.

Authentication event sensor 212 may include software that detects user domain logins, logouts, a user's use of a password-protected resource on the network, and other user authentication events. For example, authentication event sensor 212 may use a pulling scheme to poll the domain server to determine which users have logged in since the last polling event. Additionally or alternatively, use a push scheme to receive messages from, for example, the domain server when a logon event occurs. In this case, the domain server may be equipped with a service that sends logon events to authentication event sensor 212 as they occur. In yet another embodiment, logon events may be stored in binding database 210. Authentication event sensor 212 may query binding database 210 to identify and process the logon events. In other instances, authentication event sensor 212 may populate binding database 210 with logon event data after authentication event sensor 212 detects a logon event on the network.

Intrusion detection sensor 214 may include software that detects attempts to access restricted system resources. These may include multiple login attempts with invalid passwords, access to a restricted file share, etc. As an example, intrusion detection sensor 214 may identify an intrusion if a user attempts, for instance, three or more logons with a different password each time.

In some embodiments, an intrusion detection sensor may report intrusion events to DFI server 112. DFI server 112 can adjust network access based upon these intrusion events. For instance, it may adjust network connectivity on systems identified as infected by the intrusion detection sensor events. In embodiments, the emphasis of the DFI server may be less on the intrusion detection sensor itself and more on the fact that network security is dynamically adjusted in response to events received by an intrusion detection sensor. An example of an intrusion detection sensor is a system that inspects network packets and generates an event when the packet data contains a known malicious signature.

For example, intrusion detection sensor 214 may use a pulling scheme to poll one or more network servers to identify failed login attempts that match a network intrusion profile. Additionally or alternatively, use a push scheme to receive messages from, for example, the one or more servers when a potential intrusion is detected by the server. In this case, the server may be equipped with a service that identifies intrusion logon attempts and send information about the intrusion to intrusion detection sensor 214 as they occur. In yet another embodiment, logon events may be stored in binding database 210 and intrusion detection sensor 214 may query binding database 210 looking for logon events or resource accesses that match an intrusion profile. In other instances, intrusion detection sensor 214 may populate binding database 210 with detected intrusion data after intrusion detection sensor 214 detects an intrusion or an attempted intrusion on the network.

Antivirus sensor 216 may include software that detects antivirus events, such as a virus infiltrating the network, an email with an attached virus entering the network, or a computer that identifies and cleans or blocks a virus. For example, antivirus sensor 216 may use a pulling scheme to poll any computing device on the network to determine which, if any, computing devices have a virus or have detected a virus. Additionally or alternatively, antivirus sensor 216 may use a push scheme to receive messages from, for example, another computing device when a virus is detected by the computing device. In this case, the domain server may be equipped with a service that sends virus event information to antivirus sensor 216 as they occur. In yet another embodiment, virus events may be stored in binding database 210. Antivirus sensor 216 may query binding database 210 to identify and process any virus events that have been recorded in the database. In other instances, antivirus sensor 216 may populate binding database 210 with antivirus event data after antivirus sensor 216 detects or receives information about a virus event on the network.

The sensor event handlers 204 may include an authentication policy handler 218, an intrusion policy handler 220, and an antivirus policy handler 222. Each policy handler 218-222 may receive data from a respective sensor 212-216 according to a data format or Application Programming Interface (API) specific to its type. For example, authentication event sensor 212 may communicate with authentication policy sensor 218 with a different data format or API than that used by intrusion detection sensor 214 and intrusion detection policy handler 220.

Each of the sensor event handlers may contain a set of high level security rules, and may produce one or more high-level security statements that dictate, based on the high-level security rules, whether the event should be allowed, denied, limited, etc., and whether network connectivity should be adjusted. For example, one security rule may specify that user A is allowed to communicate with computing devices 102a, 102b, or 102c, but not communicate with computing devices 102d-102f (see FIG. 1). If user A logs into computing device 102a, authentication event sensor 212 may detect the login attempt and forward data describing the login attempt to authentication policy handler 218. Authentication policy handler 218 may then apply the rule regarding user A, determine that user A on device 102a may communicate with devices 102b and 102c, and provide a high-level security statement stating that these communication paths are allowed.

In embodiments, high-level rules may encompass entities (users, devices, etc.) that do not yet exist. A simple policy could be, for example, that user A may communicate (via the network) with user B and server 110. When user A logs into a device such as 102a, the authentication sensor event handler might issue a high-level rule that user A on device 102a may communicate (ALLOW) with user B (who may not yet be in the network) and server 110. The specific communication paths need not be specified at this level.

Suppose device 102c reports a virus infection to the anti-virus sensor 216. An example high level rule issued by an anti-virus sensor event handler may specify that device 102c may not communicate (DENY) with devices 102a-f (excepting itself). In addition, device 102c may communicate with servers 110 no faster than 0.5 Mbps (LIMIT).

An example of a high-level rule using a particular API syntax (but not limited to that syntax) is as follows: (("device": "102c"), ("device": "102a"), ("action": "deny")). This rule denies all communication from device 102c to 102a. Rules may also be defined over users instead of devices, as well as any other high-level identifier that can be linked to low-level network identifiers.

Many such rules may be implemented or supported by the system 200. The above examples do not limit the types of high-level rules nor do they limit the uses of any types of high level rules.

The high-level security rules implemented by system 200 may be stored in a policy database (not shown). The database may be dynamically updated as rules are removed and added by sensor event handlers 204.

The policy handlers 218-222 may also access information from binding database 210 in order to produce high level security statements. For example, a security rule may specify that user B can log into only one computing device 102a-102f at a time. Assume that user B is logged into computing device 102a and attempts to also log into computing device 102b. Binding database 210 may include a record indicating that user B is logged into computing device 102a. When authentication policy handler 218 receives notification from authentication event sensor 212 that user B is attempting to log into computing device 102b, authentication policy handler 218 may access binding database 210 to determine if user B is already logged into another computing device. In this example, authentication policy handler 218 may determine, based on the record in binding database 210, that user B is already logged into computing device 102a and issue a high level security statement indicating that user B's login attempt to computing device 102b should be denied.

One example may arise when an intrusion detection sensor detects an intrusion but at a low confidence level. In this case the bandwidth for the suspicious systems could be limited until the systems are further investigated. More generally, bandwidth may be limited in any circumstance in which the evidence is insufficient to justify a full block, or in which a full block could impede mission-critical functionality, and yet is suspicious. It can also be restricted when it is known that bandwidth will not exceed a certain amount if used only in the authorized manner.

As an example of an intrusion detection policy, intrusion detection policy handler 220 may contain a rule that, if three or more login attempts fail from a particular external Internet Protocol (IP) address, that the external IP address should be blocked from further access. In the event that intrusion detection sensor 214 detects three failed login attempts from IP address 168.192.1.2, intrusion detection policy handler 220 may issue a high-level security statement that login attempts from that IP address should be blocked. Other rules may include preventing or allowing login attempts from certain geographical areas, preventing or allowing login attempts at certain times of day, etc.

As another example, an intrusion detection sensor may generate an event indicating that an intrusion has been detected on a network segment. The intrusion detection policy handler may issue a high-level security statement indicating that the connectivity for this network segment should be adjusted such that systems on the suspicious segment may only reach honeypot systems, or that full network packet capture should be enabled on the triggered systems.

As an example of an antivirus policy, antivirus policy handler 222 may contain a rule that emails originating from external sources and containing a certain type of attachment (e.g. a zip file) should be blocked. Assume that antivirus sensor 216 detects that a mail server has received an external email with a zip attachment and sends information about the event to antivirus policy handler 222. Antivirus policy handler 222 may issue a high-level security statement that the email should be blocked. Other rules may include preventing or allowing transmissions from certain geographical areas, preventing or allowing execution of certain file types, etc.

In some embodiments, an antivirus sensor may detect that a system has executed a known malicious program and may send an event to the antivirus policy handler indicating that the system is compromised. The antivirus policy handler may subsequently issue a high-level security statement indicating that the network connectivity be adjusted such that this system can only access limited number of systems required for remediation.

In an embodiment, one or more of the policy handlers 218-222 may be given a priority value. The priority may specify which high level rules should be implemented first, or take precedence over potentially conflicting rules. As an example, antivirus policy handler 222 and the high level rules it produces may be given a higher priority than authentication policy handler 218 and the high level rules it produces.

System 200 may also include policy resolver 206, which may receive the high level rules from policy handlers 218-222 and produce a low level rule that can be implemented in a router or firewall table. Policy resolver 206 may parse the high level rule and translate it into low level code that can be executed by a firewall. For example, a high level rule that states that logon attempts from a particular geographical area should be blocked may be translated into: DENY XXX.XXX.XXX, where XXX.XXX.XXX.XXX is an IP subnet corresponding to the geographical area. One skilled in the art will recognize that IP is used as an example and other network protocols may be used.

Policy resolver may also use the priorities associated with the high level rules to resolve conflicting high level rules received from policy handlers 218-222. Building upon the antivirus/authentication examples from above, a higher priority antivirus policy may be applied before the lower priority authentication policy but the authentication policy may be applied once the conflicting antivirus policy is removed (e.g. the antivirus scan reported no infections on the system). Rules may be applied in blocks of priority level, such that all rules of priority 1 appear before all rules of priority 2. As such, a conflict may be resolved by using the first matching rule. This example scheme allows a lower priority rule to be triggered if all conflicting rules of higher priority are removed.

One example of a rule conflict could arise in the following scenario. User B is logged into device 102b. User A logs into device 102a, which is infected with a virus. The authentication policy 218 may issue a rule at low priority that allows user A to communicate with user B. However, the anti-virus policy 222 may issue a rule at high priority that blocks device 102a from all communications. When user A on device 102a tries to communicate with user B on device 102b, the higher priority rule is used to block that communication. At some later time, device 102a is cleaned, and the anti-virus handler 222 now revokes the previous rule. Now the lower priority rule allows user A on device 102a to communicate with user B on device 102b.

One skilled in the art will recognize that other priority resolution schemes exist and may be used in place of, or in addition to, the exemplified scheme.

The low level rules from policy resolver 206 may be received by policy enforcement kernel 208, which may program the rules into firewall table 224, where they can be implemented by a firewall.

In an embodiment, system 200 may include an OpenFlow controller system 226 having one or more OpenFlow applications 228. One skilled in the art will recognize that OpenFlow controller system 226 may comprise one or more controllers that determine the path of data packets through the network. The OpenFlow controllers may comprise (or receive data from) OpenFlow applications 228 and subsequently program router tables or firewall tables in response to the determined path of data packets. In certain instances, OpenFlow controller system 226 may attempt to program firewall table 224 with instructions that conflict with those generated by dynamic flow system 200. In this case, policy enforcement kernel 208 may determine which instructions should be programmed into firewall table 224.

In one embodiment, policy enforcement kernel 208 may program firewall table 224 so that any instructions provided by policy resolver 206 override or take precedence over any instructions provided by OpenFlow controller 226. Those instructions provided by OpenFlow controller 226 may be programmed into forwarding table 226 by policy enforcement kernel 208, for example. In another embodiment, policy enforcement kernel 208 may program firewall table 224 with instructions provided by both OpenFlow controller 226 and policy resolver 206, but may check the instructions for any conflicting instructions. In this case, policy enforcement kernel 208 may drop any conflicting instructions provided by OpenFlow controller 226 and instead program firewall table 224 with the instruction provided by policy resolver 206. In yet another embodiment, policy enforcement kernel 208 may drop some or all instructions provided by OpenFlow controller 226 and program only instructions from policy resolver 206 into firewall table 224. One skilled in the art will recognize that policy enforcement kernel 208 may be configured to enforce any policy regarding conflicting instructions provided by OpenFlow controller 226 and policy resolver 206. However, in certain embodiments, it may be preferable for policy enforcement kernel 208 to enforce a policy that gives precedence to the instructions provided by policy resolver 206.

Once firewall table 224 (and/or forwarding table 226) is programmed with instructions from policy resolver 206, system 200 may route traffic through the network according to the instructions generated by dynamic flow system 200. As noted above, the instructions generated by dynamic flow system 200 may include instructions dynamically generated in response to events that are detected by sensors 202 and/or by the current state of the network as captured in binding database 210.

Dynamic flow system 200 may also include a control interface 228, which may comprise a user interface through which a user may monitor and/or change events, rule generation, routing policies, and other elements described above.

Figure 3:
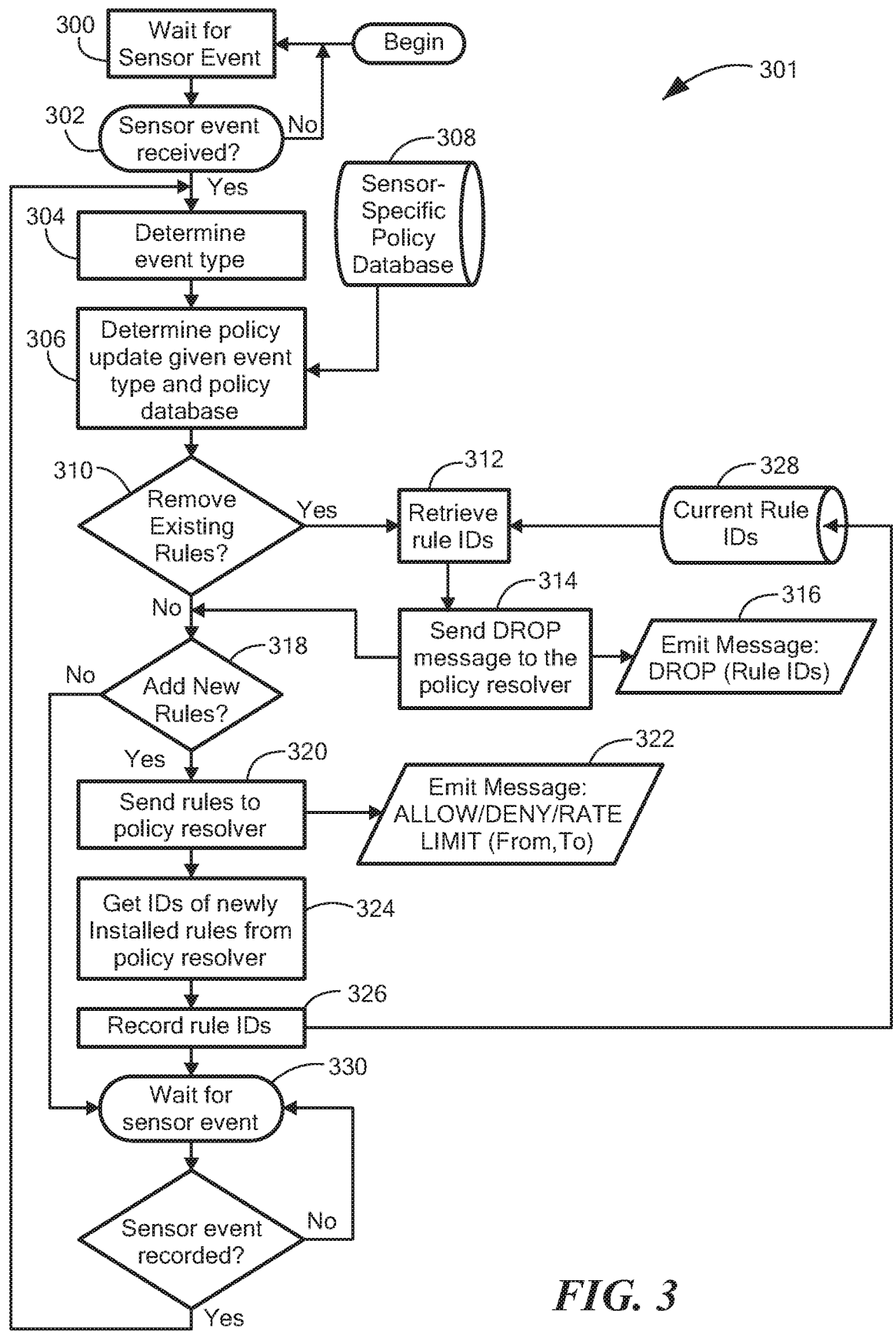
FIG. 3 is a flow diagram of a process for transforming data.

Referring to FIG. 3, a flowchart illustrates a process 301 for generating security rules in a dynamic flow system, such as dynamic flow system 200. In box 300, sensors 202 may wait for (or poll for) a sensor event, such as an authentication event, an intrusion event, an anti-virus event, etc. If a sensor event is received in decision box 302, sensor event handlers 204 may determine the type of event (such as an authentication event, an intrusion event, an anti-virus event, etc.) in box 304. If no event is received in decision box 302, the system may continue to wait for a sensor event in box 304.

In box 306, sensor event handlers 204 may generate a policy update (e.g. generate high level commands) based on the received event and any relevant information stored in a policy database 308. The policy database 308 may be a database storing all currently implemented high level commands produced by sensor event handlers 204.

In embodiments, sensor-specific policy database 308 may store all possible policies that this event handler may generate. For example, an authentication sensor policy database may include a list of all users and their access control lists (ACL) that defines which entities that user may communicate with. The following pseudo-code provides an example of one such policy database:
  Entity→ACL [(entity, rule), . . . ]
  User A→[(user B, allow), (user C, block)]
  Device 102a→[(server 110, limit 1 Mbps)]
One skilled in the art will recognize that this database format may take many different forms based on the type of sensor, the type of sensed event, etc.

In decision box 310, system 310 may determine if any previously existing rules (i.e. high-level commands) conflict with the newly created high-level commands in box 306 and need to be removed from the current rule set. If so, system 312 may retrieve the rule ID (which may be a unique identifier) in box 312, and send a drop message to policy resolver 206 in box 314. The drop message may instruct policy resolver 314 to drop the rule (e.g. the high level command and/or low level instruction) from the current rule set. The drop message may be issued by combining the DROP function with the previously received rule ID, as shown in box 316.

If an existing rule does not need to be removed in decision box 310, process 301 may advance to decision box 318 to determine if a new rule should be added. If the rule is the same as another rule that is already implemented, the system does not need to add a new rule and can advance to box 330 to wait for the next sensor event. However, if the current rule is not already implemented, the system may proceed to box 320 where the sensor event handlers may send the rule (e.g. the high level command) to policy resolver 206. The new rule may be issued to policy resolver 206 by issuing an ALLOW, DENY, and/or RATE LIMIT rule according to box 322. Other high-level rules may be supported by the system.

In box 324, policy resolver 206 may produce an ID for the newly created rule. The system may retrieve the ID and, in box 326, record the rule ID in the current rule database 328.

The system may then proceed to box 330 where it waits for the next event from sensors 202. When the next event is received, the system may again proceed to box 304.

Figure 4:
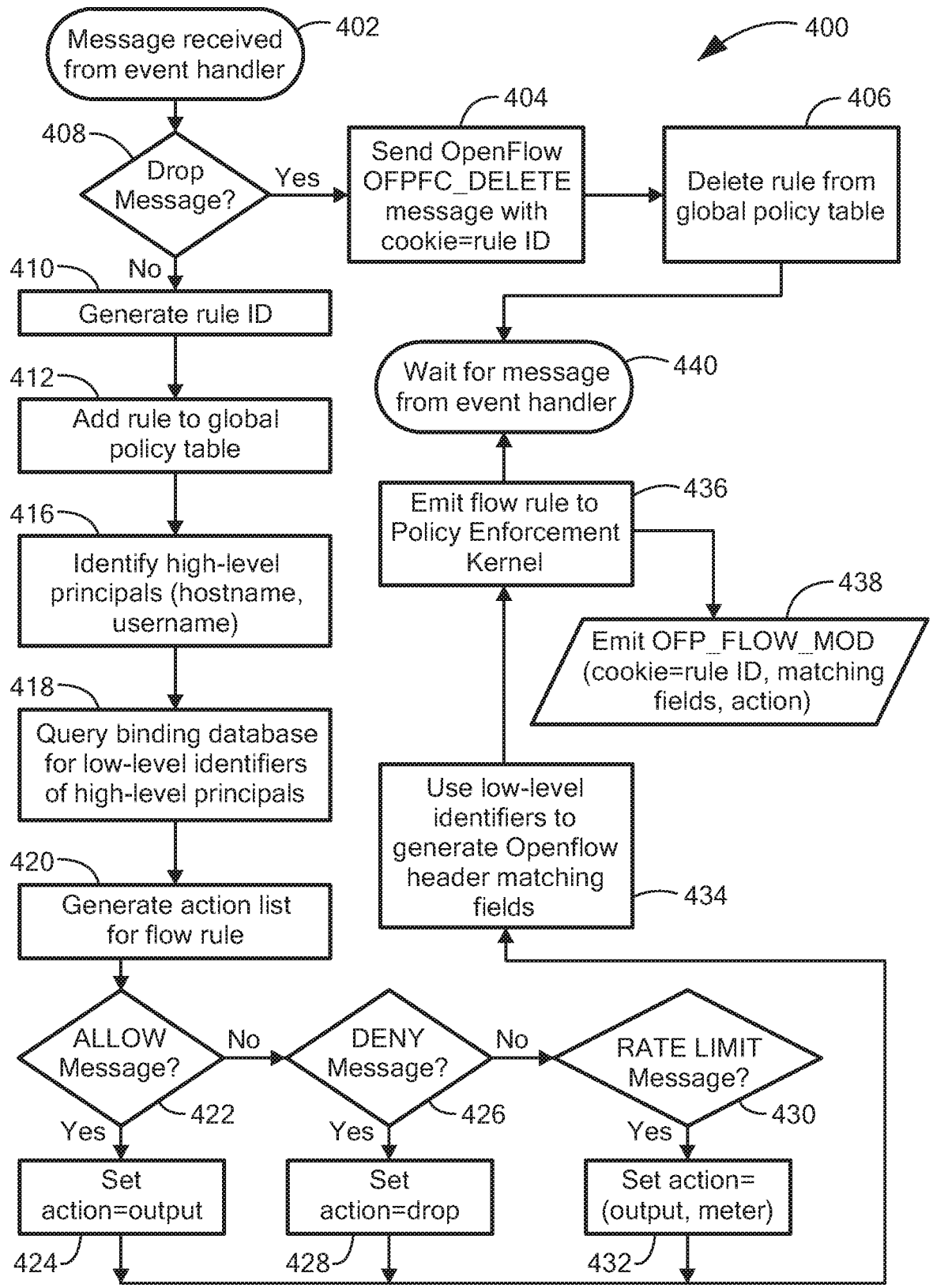
FIG. 4 is a flow diagram of a process for transforming data.

Referring now to FIG. 4, a flowchart illustrates a process 400 for updating a global policy table with rules generated by a dynamic flow system, such as system 200. In box 402, policy resolver 206 waits for a message (e.g. a high level command) received from one or more of the sensor event handlers 204. In decision box 408, policy resolver 206 determines if the high level command corresponds to a DROP message. If so, in box 404, policy resolver 206 issues an OpenFlow OFPFC_DELETE command to policy enforcement kernel 208, which in turn deletes the low level rule from the global policy table (e.g. from firewall table 224) in box 406. Policy resolver 206 then waits for the next message from event handlers 204 in box 440 and begins the process 400 again.

In decision box 408, if policy resolver 206 determines the high level command does not correspond to a DROP message, the process generates a new rule ID (which may be a unique identifier) in box 410, and adds the rule and the newly created ID to the global policy table (not shown) in box 412 that is accessible by sensor event handlers 204.

In box 416, policy resolver 206 identifies any high-level principals associated with the rule. These principals may be hostnames, usernames, MAC addresses, IP addresses, or any other identifier. Policy resolver 206 may query binding database 210 for any existing principals that may be stored there. For example, if the high-level rule being processed states that User A can only communicate with computing device 102a, then policy resolver may identify principals such as User A's username and/or computing device 102a's IP address, MAC address, hostname, etc.

In box 420, the system may generate an action list for flow rules. In general, each rule may be a multi-part that comprises one or more actions such as ALLOW, DENY, RATE, etc. The action list is a list or array of such actions that may be associated with the high level rule. For example, consider a high level rule that says port 22 on server X can be accessed from LAN addresses only, but User A can access port 22 from any location. Such a high level rule may be implemented by a series of rules. The first in the series may be an ALLOW rule that allows traffic from the machine on which User A is logged on to access port 22, and the second in the series may be a DENY rule that denies access to port 22 from any location outside the LAN.

In decision box 422, if the high level rule comprises an ALLOW message, policy resolver may set an action to output in box 424.

In box 424, the action field of the OpenFlow message may be set to 'output.' In other words, an OpenFlow action may be set, where "output" indicates that the switch should output the matching packet as instructed by the action. In embodiments, a table ID or switch port to which the packet is to be output may be included.

In decision box 426, if the high-level rule comprises a DROP message, policy resolver may set an action to drop in box 428. And in decision box 430, if the high level rule comprises a RATE message, policy resolver may set an action to (output, meter) in box 432.

After setting the action in boxes 424, 428, and/or 432, policy resolver 206 may use low-level identifiers to generate an OpenFlow header with matching fields in box 434. For example, if the high level rule being processed states that User A can only log in to computing device 102a, then policy resolver 206 may identify low-level identifiers (e.g. from binding database 210) such as User A's username and/or computing device 102a's IP address, MAC address, hostname, etc. These low-level identifiers may be combined into a low level rule along with the actions identified in boxes 424, 428, and 432.

In box 436, policy resolver 206 may issue (e.g. emit) the low level rule to policy enforcement kernel 208 via an emit statement in box 438. Policy enforcement kernel 208 may subsequently program the low level rule into firewall table 224 as described above. The process may then proceed to box 440 where it waits for another message from event handlers 204 to begin the process anew.

Figure 5:
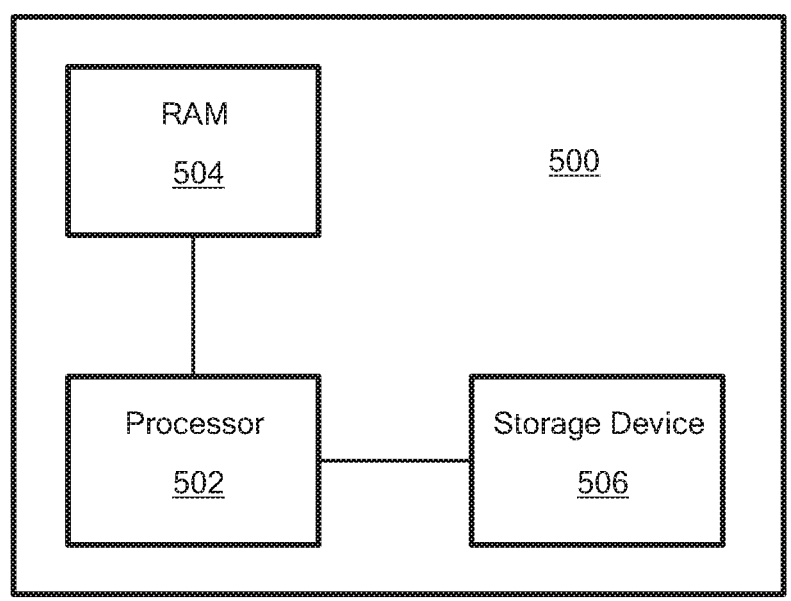
FIG. 5 is a block diagram of a computing device.

Some or all of the features and processes described above may be implemented by programmable code (such as software, firmware, scripts, etc.) executed by a computing device. FIG. 5 shows an exemplary computing system 500 that can execute software. System 500 includes a processor 502 (which may be the same as or similar to processor 110), a random access memory (RAM) 504, and a storage device 506, which may be a hard drive, a CD, a DVD, a flash drive, or any other type of non-volatile memory. Software instructions may be stored in RAM 504 and/or storage device 506. Processor 502 may be coupled to storage device 506 and/or RAM 504 so that processor 502 can read the software instructions. As processor 502 reads the software instructions, the software instructions may cause processor 502 to perform operations, as described above, for computing the position of a magnetic target. Although not shown, processor 502 and/or system 500 may include other inputs and outputs, such as inputs for receiving the signals from the sensing elements, GPIO, power inputs, or other interfaces such as USB, SATA, HDMI, and the like.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims. All references cited herein are hereby incorporated herein by reference in their entirety.

The invention claimed is:

1. A system for implementing security policies across a network, the system comprising:
   a policy database configured to contain one or more security policies for the network;
   one or more network switches configured to route traffic on the network;
   a plurality of network sensors configured to monitor and detect one or more network security events occurring on the network; and
   a dynamic flow interface (DFI) server configured to
      generate a security policy update based on a network security event and current security policies implemented across the network, the network security event detected by a network sensor of the plurality of network sensors, the network security event indicative of an event at the network sensor;
      determine whether the security policy update conflicts with an existing rule in a current rule set, the current rule set comprising one or more rules implementing at least one security policy of the current security policies, the current rule set being applied to at least one network switch of the one or more network switches to route traffic on the network;
      responsive to a determination that the security policy update conflicts with the existing rule in the current rule set, cause the existing rule to be dropped from the current rule set such that the existing rule is no longer applied to the at least one network switch to route traffic on the network, wherein to drop the existing rule from the current rule set implements the security policy update; and
      responsive to a determination that the security policy update does not conflict with the one or more rules in the current rule set and that a new rule implementing the security policy update needs to be added to the current rule set, cause the new rule to be added to the current rule set such that the new rule is applied to the at least one network switch to route traffic on the network;
   wherein the DFI server is distinct from the one or more network switches and the plurality of network sensors.

2. The system of claim 1 wherein the DFI server is also configured to assign a priority to the security policy update.

3. The system of claim 1 wherein the new rule limits a rate of data access, deny access, and/or allow access.

4. The system of claim 1 wherein cause the new rule to be added to the current rule set comprises to program the at least one network switch with the new rule.

5. The system of claim 4 wherein to program the at least one network switch with the new rule comprises to program the new rule into a firewall table or a forwarding table used by the at least one switch to route traffic on the network.

6. The system of claim 1 wherein the new rule is generated based on the network security event and a current state of the network.

7. The system of claim 1 wherein cause the existing rule to be dropped from the current rule set comprises to delete the existing rule from a table used by the at least one network switch to route traffic on the network.

8. The system of claim 7 wherein the table is a firewall table.

9. The system of claim 7 wherein the table is a forwarding table.

10. A method for implementing security policies across a network, the method comprising:

generating, by a dynamic flow interface (DFI) server, a security policy update based on a network security event and current security policies implemented across the network, the network security event detected by a network sensor that is distinct from the DFI server, the network security event indicative of an event at the network sensor;

determining, by the DFI server, whether the security policy update conflicts with an existing rule in a current rule set, the current rule set comprising one or more rules implementing at least one security policy of the current security policies, the current rule set being applied to at least one network switch to route traffic on the network, the at least one network switch being distinct from the DFI server;

responsive to a determination that the security policy update conflicts with the existing rule in the current rule set, causing, by the DFI server, the existing rule to be dropped from the current rule set such that the existing rule is no longer applied to the at least one network switch to route traffic on the network, wherein dropping the existing rule from the current rule set implements the security policy update; and responsive to a determination that the security policy update does not conflict with the one or more rules in the current rule set and that a new rule implementing the security policy update needs to be added to the current rule set, causing, by the DFI server, the new rule to be added to the current rule set such that the new rule is applied to the at least one network switch to route traffic on the network.

11. The method of claim 10 further comprising assigning a priority to the security policy update.

12. The method of claim 10 wherein causing the existing rule to be dropped from the current rule set comprises deleting, by the DFI server, the existing rule from a table used by the at least one network switch to route traffic on the network.

13. The method of claim 12 wherein the table is a firewall table.

14. The method of claim 12 wherein the table is a forwarding table.

15. The method of claim 10 wherein causing the new rule to be added to the current rule set comprises programming, by the DFI server, the at least one network switch with the new rule.

16. The method of claim 15 wherein programming the at least one network switch with the new rule comprises programming the new rule into a firewall table or a forwarding table used by the at least one switch to route traffic on the network.

17. The method of claim 10 wherein the new rule limits a rate of data access, denies access, and/or allows access.

18. The method of claim 10 wherein the new rule is generated based on the network security event and a current state of the network.

19. A system for implementing security policies across a network, the system comprising:
a plurality of computing devices that communicate on the network;
a plurality of network sensors that monitor and detect security events occurring on the network;
a policy database that contains security policies for the network;
a binding database that contains data representing a current state of the network; and
a dynamic flow interface (DFI) server that
generates a security policy update based on a network security event and current security policies implemented across the network, the network security event detected by a network sensor of the plurality of network sensors, the network security event indicative of an event at the network sensor;
determines whether the security policy update conflicts with an existing rule in a current rule set, the current rule set comprising one or more rules implementing at least one security policy of the current security policies, the current rule set being applied to at least one network switch to route traffic on the network;
responsive to a determination that the security policy update conflicts with the existing rule in the current rule set, causes the existing rule to be dropped from the current rule set such that the existing rule is no longer applied to the at least one network switch to route traffic on the network, wherein the existing rule being dropped from the current rule set implements the security policy update; and
responsive to a determination that the security policy update does not conflict with the one or more rules in the current rule set and that a new rule implementing the security policy update needs to be added to the current rule set, causes the new rule to be added to the current rule set such that the new rule is applied to the at least one network switch to route traffic on the network;
wherein the DFI server is distinct from the plurality of network sensors and the at least one network switch.

20. The system of claim 19 wherein the new rule is generated based on the network security event and the data representing the current state of the network.

* * * * *